UNITED STATES PATENT OFFICE.

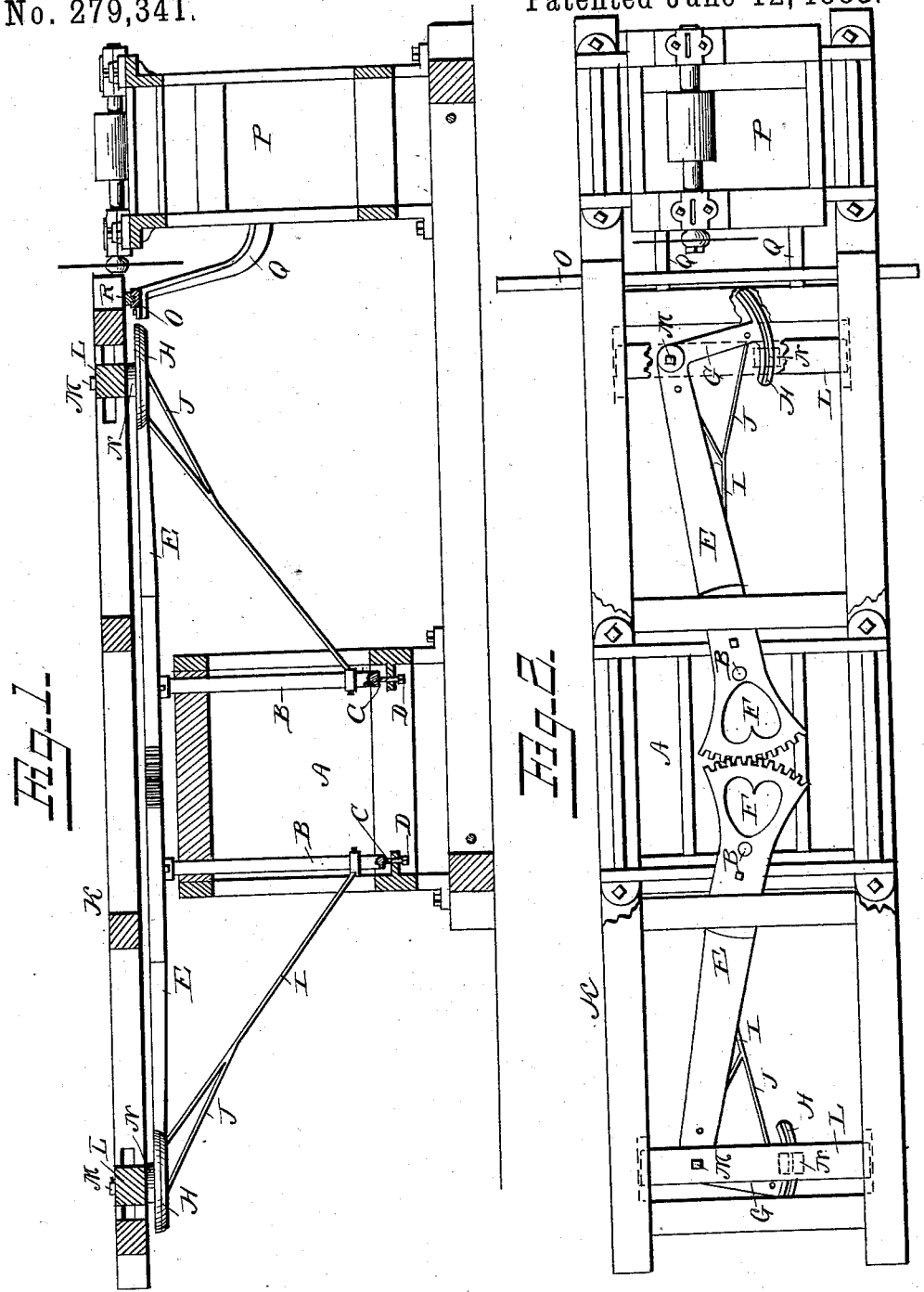

JAMES W. COLE, OF NASHVILLE, TENNESSEE.

SAW-TABLE.

SPECIFICATION forming part of Letters Patent No. 279,341, dated June 12, 1883.

Application filed March 22, 1883. (No model.)

*To all whom it may concern:*

Be it known that I, JAMES W. COLE, a citizen of the United States, residing at Nashville, in the county of Davidson and State of Tennessee, have invented a new and useful Saw-Table, of which the following is a specification, reference being had to the accompanying drawings.

This invention relates to saw-tables; and it consists in the improved construction and arrangement of a horizontally-swinging bed or table, as will be hereinafter fully described, and particularly pointed out in the claims.

In the drawings hereto annexed, Figure 1 is a longitudinal vertical sectional view, and Fig. 2 is a plan view, parts of the table-top having been broken away for the purpose of better showing the construction.

The same letters refer to the same parts in both figures.

A in the drawings designates a suitable frame, having boxes or bearings for two vertical shafts, B B, having pivot-points C at their lower ends, sockets or bearings for which are provided in the upper ends of vertically-adjustable set-screws D. The upper ends of the shafts or spindles B B have horizontal bars E E, the inner ends of which are provided with toothed segments F F, meshing together, as shown. The outer ends of the bars E have laterally-projecting arms G, provided with curved segmental guides H. The outer ends of the bars E are connected with the lower ends of the shafts or spindles B by inclined braces I, and supplemental braces J connect the braces I with the under sides of the guides H, thereby bracing the horizontal bars E and the guides H securely against vertical pressure.

K designates the saw-table, which is provided with cross-bars L L, having a short transverse sliding motion; or the said cross-bars may be pivoted at one of their ends, if preferred. The table is mounted upon the frame by means of the cross-bars L, which are connected by vertical pivots M with the outer ends of the bars E. The under sides of the cross-bars L are also provided with segmental tracks N for the curved guides H, which thus assist in supporting the table in a true horizontal position.

O is a straight transverse guide, which is secured either to the frame A, by means of a suitable bracket, or it may, as shown in the drawings, be secured to the frame P of the saw by means of a bracket, Q. The guide O engages a track, R, arranged transversely under the end of the table K, as shown.

In operation the material to be fed to the saw is placed upon the table, the top of which is moved or slid in a forward direction far enough to enable the portion to be cut off by the saw to be pushed or fed the requisite distance beyond the edge of the table-top. The latter is then pushed in a rearward direction, thus bringing the material up to the saw and into engagement with the latter. This motion of the table-top is permitted by the vertical shafts, upon which the table-top is mounted, by means of the horizontal bars at the upper ends of the said shafts, the outer swinging ends of said bars being connected pivotally to the cross-bars L, which in turn have a limited sliding motion, so as not to interfere with the free movement of the horizontal swinging bars. The tracks and guides N H and R O insure steadiness of action. This invention is applicable not only to saw-tables, but to all machinery where it is desired to acquire a horizontal swinging or reciprocating motion.

I claim as my invention and desire to secure by Letters Patent of the United States—

1. The combination of a frame, a pair of shafts or spindles mounted vertically in the same, horizontal bars secured at the upper ends of said spindles, and provided at their inner ends with segment-gears meshing together, and a table provided with sliding or pivoted transverse cross-bars connected pivotally to the outer ends of the horizontal bars, as set forth.

2. The horizontal bars mounted on vertical shafts or spindles, and provided at their inner ends with segment-gears meshing together, and at their outer ends with laterally-projecting arms having segmental guides, in combination with a table having pivoted or sliding transverse bars connected pivotally to the outer ends of the horizontal bars, and having suitable tracks for the segmental guides, as set forth.

3. The combination of the frame, the vertical shafts or spindles, the horizontal bars at the upper ends of the latter, having segment-gears at their inner ends and laterally-projecting arms at their outer ends, the braces connecting the outer ends of the horizontal bars with the lower ends of the spindles, the sub-braces connecting said braces with the laterally-projecting arms of the horizontal bars, and the table mounted upon the said horizontal bars, substantially as set forth.

4. The combination of the vertical shafts or spindles, the horizontal bars at the upper ends of the same, meshed together at their inner ends, the table having sliding or pivoted cross-bars mounted pivotally at the outer ends of the said horizontal bars, and a straight guide suitably arranged to prevent lateral displacement of the table, as set forth.

In testimony that I claim the foregoing as my own I have hereto affixed my signature in presence of two witnesses.

JAMES WILLIAM COLE.

Witnesses:
J. R. McCANN,
R. L. ARMISTEAD.